(12) United States Patent
Collet et al.

(10) Patent No.: US 11,551,461 B2
(45) Date of Patent: Jan. 10, 2023

(54) TEXT CLASSIFICATION

(71) Applicant: I.R.I.S., Mont-Saint-Guibert (BE)

(72) Inventors: Frédéric Collet, Etterbeek (BE); Vandana Roy, Etterbeek (BE)

(73) Assignee: I.R.I.S., Mont-Saint-Guibert (BE)

( * ) Notice: Subject to any disclaimer, the term of this patent is extended or adjusted under 35 U.S.C. 154(b) by 158 days.

(21) Appl. No.: 16/845,720

(22) Filed: Apr. 10, 2020

(65) Prior Publication Data

US 2021/0319247 A1 Oct. 14, 2021

(51) Int. Cl.
  *G06V 30/148* (2022.01)
  *G06K 9/62* (2022.01)
  *G06V 30/413* (2022.01)
  *G06V 30/10* (2022.01)

(52) U.S. Cl.
  CPC ......... *G06V 30/153* (2022.01); *G06K 9/6267* (2013.01); *G06V 30/413* (2022.01); *G06V 30/10* (2022.01)

(58) Field of Classification Search
  CPC .... G06V 30/10; G06V 30/153; G06V 30/413; G06V 30/1463; G06V 10/82; G06K 9/6267; G06N 3/02
  See application file for complete search history.

(56) References Cited

U.S. PATENT DOCUMENTS

| | | | |
|---|---|---|---|
| 8,744,171 B1* | 6/2014 | Smith | G06V 30/2268 382/182 |
| 9,070,035 B2* | 6/2015 | Pan | G06V 10/242 |
| 2009/0161991 A1* | 6/2009 | Nestares | G06V 10/242 382/296 |
| 2013/0294696 A1* | 11/2013 | Sun | G06T 7/70 382/182 |
| 2020/0175267 A1* | 6/2020 | Schäfer | G06V 10/454 |

* cited by examiner

*Primary Examiner* — Daniel G Mariam
(74) *Attorney, Agent, or Firm* — Canon U.S.A., Inc. IP Division

(57) ABSTRACT

A text classifying apparatus (100), an optical character recognition unit (1), a text classifying method (S220) and a program are provided for performing the classification of text. A segmentation unit (110) segments an image into a plurality of lines of text (401-412; 451-457; 501-504; 701-705) (S221). A selection unit (120) selects a line of text from the plurality of lines of text (S222-S223). An identification unit (130) identifies a sequence of classes corresponding to the selected line of text (S224). A recording unit (140) records, for the selected line of text, a global class corresponding to a class of the sequence of classes (S225-S226). A classification unit (150) classifies the image according to the global class, based on a confidence level of the global class (S227-S228).

14 Claims, 10 Drawing Sheets

여섯번째가 (아이들 결혼
상대좀 잡아봐!!)
일곱번째가 (시부모 수종드는 것
어떻게 안되나요?)
여덟번째가 (남아 있는 적금
채무를 어떻게 해주세요)

FIG. 6A: Korean – 0 degrees

Шестьдесят шесть бывших пациентов Сергея МИРО-
НОВА стали чемпионами и призерами Олимпийских
игр. Весной этого года, ему, руководителю клиники спо-
ртивной и балетной травматологии, Международным
олимпийским комитетом было присвоено почетное зва-
ние «Лучший спортивный врач года».

ЧЕМПИОН
БЕЗ МЕДАЛЕЙ

Фото из журнала «СПОРТИВНАЯ ЖИЗНЬ РОССИИ»

FIG. 6B: Cyrillic – 180 degrees

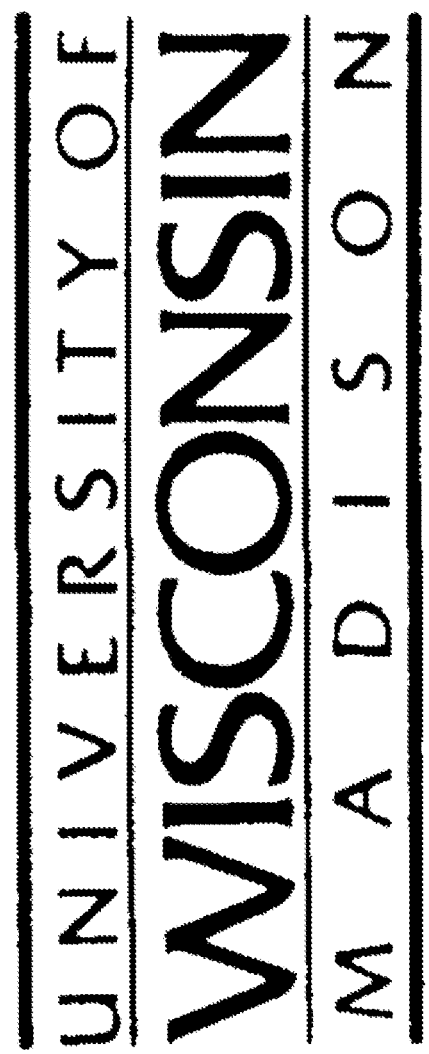
FIG. 6C: Arabic, 90 degrees          FIG. 6D: Latin, 270

FIG. 7A: Input Image

Ярослав С.
22 года. Холост.
Окончил Академию МВД в Киеве.
Инструктор по подготовке спецподразделе-
ний по борьбе с преступлениями.
В Нью-Йорке четыре месяца
Хобби - книги.

FIG. 7B: Line Segmentation Result

Инструктор по подготовке спецподразделе-
701
Confidence of line = 0.971

Окончил Академию МВД в Киеве
702
Confidence of line = 0.963

нии по борьбе с преступлениями
703
Confidence of line = 0.959

В Нью Иорке четыре месяца
704
Confidence of line = 0.957

Хобби книги
705
Confidence of line = 0.930

| Line No. | Result at Line Level | | | Global Result | | | |
|---|---|---|---|---|---|---|---|
| | Script | Orient-ation | Frequency | Script | Orient-ation | Frequency | Confidence |
| 1 | CYRILLIC | 0 | 19 | CYRILLIC | 0 | 19 | 5.5% |
| | LATIN | 0 | 18 | LATIN | 0 | 18 | |
| 2 | CYRILLIC | 0 | 16 | CYRILLIC | 0 | 35 | 40% |
| | LATIN | 0 | 7 | LATIN | 0 | 25 | |
| 3 | CYRILLIC | 0 | 18 | CYRILLIC | 0 | 53 | 55.8% |
| | LATIN | 0 | 9 | LATIN | 0 | 34 | |
| 4 | CYRILLIC | 0 | 11 | CYRILLIC | 0 | 63 | 40% |
| | LATIN | 0 | 10 | LATIN | 0 | 45 | |
| 5 | CYRILLIC | 0 | 9 | CYRILLIC | 0 | 72 | 60% |
| | LATIN | 180 | 1 | LATIN | 0 | 45 | |
| | | | | LATIN | 180 | 1 | |

Final Result:
Script = Cyrillic
Orientation = 0
Confidence = 60%

FIG. 7C: Text Classification

TEXT CLASSIFICATION

TECHNICAL FIELD

The present disclosure relates to text classification. In particular, the present disclosure relates to a text classifying apparatus, an optical character recognition apparatus, a text classifying method, and a program.

BACKGROUND

Optical character recognition (OCR) is performed to convert text included in an image into machine-encoded text. Images that can be analysed using OCR software include a scanned document, a photograph of a document, a photograph of a scene, a video recording, and text that has been superimposed on a document. The text in the image that can be converted includes typewritten, handwritten, and printed text. The machine-encoded text includes any character encoding standard for electronic communication, such as ASCII, unicode and emoji.

After OCR has been performed, it is possible to extract attributes of the image that have been detected. However, OCR is computationally intensive, and so there is a demand for OCR to be customised based on the attribute of the image. Therefore, OCR can be performed more efficiently if one or more of such attributes are known before the OCR is performed.

The term "attribute" is used to refer to different variables that can be associated with the image, while the term "class" refers to the specific values of such variables that are identified for an image.

A first example of an attribute is the script of text in the image. For the script attribute, an example of a script class is Latin.

A second example of an attribute is the orientation of the text in the image. Examples of the orientation class is text having an angle with respect to the horizontal in the vicinity of 0, 90, 180 and 270 degrees.

It is possible for attributes to be identified by the user prior to OCR, although this places a burden on the user. Thus, there is a demand for text classification software capable of recording attributes as part of the image recognition process.

There is a demand to enhance the efficiency of attribute recording by text classification software. As a result, the text classification software places a lower processing burden on the processor. The reduction in processing resources to perform text classification allows these resources to be devoted to enhancing the accuracy of the text classification, and so the accuracy and efficiency of the OCR is customised for the analysis of individual images. A consequence is to increase the speed and accuracy of text classification, and further contributes to increasing the speed and accuracy for the performance of OCR.

FUJII (Sequence-to-Label Script Identification for Multilingual OCR, arXiv: 1708.04671v2, by Y. Fujii, K. Driesen, J. Baccash, A. Hurst and A. C. Popat) describes a line-level script identification method. An encoder converts a line image into a feature sequence. Then, a summarizer aggregates the sequence to classify the line. The dominant script of a line from the sequence of script codes is recorded. The majority decides a unique script label per line.

A problem with the technique proposed by FUJII is that difficulties are encountered for a multilingual OCR system handling arbitrary mixed-script and mixed-language content. FUJII leaves open the possibility that this could be dealt with by detecting scripts at finer levels, or to keep the line-level approach and consider multiple scripts.

Accordingly, a text classification technique is required that classifies an image based on an analysis of the lines of text identified in the image. It is desired for the efficiency of text classification to be enhanced by eliminating errors in the detection of the attributes, so that a global class for the image can be identified with a required level of confidence.

SUMMARY

Aspects of the present disclosure include a text classifying apparatus that comprises a segmentation unit configured to segment an image into a plurality of lines of text; a selection unit configured to select a line of text from the plurality of lines of text; an identification unit configured to identify a sequence of classes corresponding to the selected line of text; a recording unit configured to record, for the selected line of text, a global class corresponding to a class of the sequence of classes; and a classification unit configured to classify the image according to the global class, based on a confidence level of the global class.

BRIEF DESCRIPTION OF THE DRAWINGS

Embodiments will now be described, by way of example only, with reference to the accompanying drawings, in which:

FIGS. 6A-D provide image samples that are subject to text classification; and FIGS. 7A-C provide an image sample (FIG. 7A) together with image results for line segmentation (FIG. 7B) and text classification (FIG. 7C).

DETAILED DESCRIPTION

Various embodiments, features, and aspects of the disclosure will be described in detail below with reference to the drawings. Each of the embodiments described below can be implemented solely or as a combination of a plurality of the embodiments or features thereof where necessary or where the combination of elements or features from individual embodiments in a single embodiment is beneficial.

Figure 1:
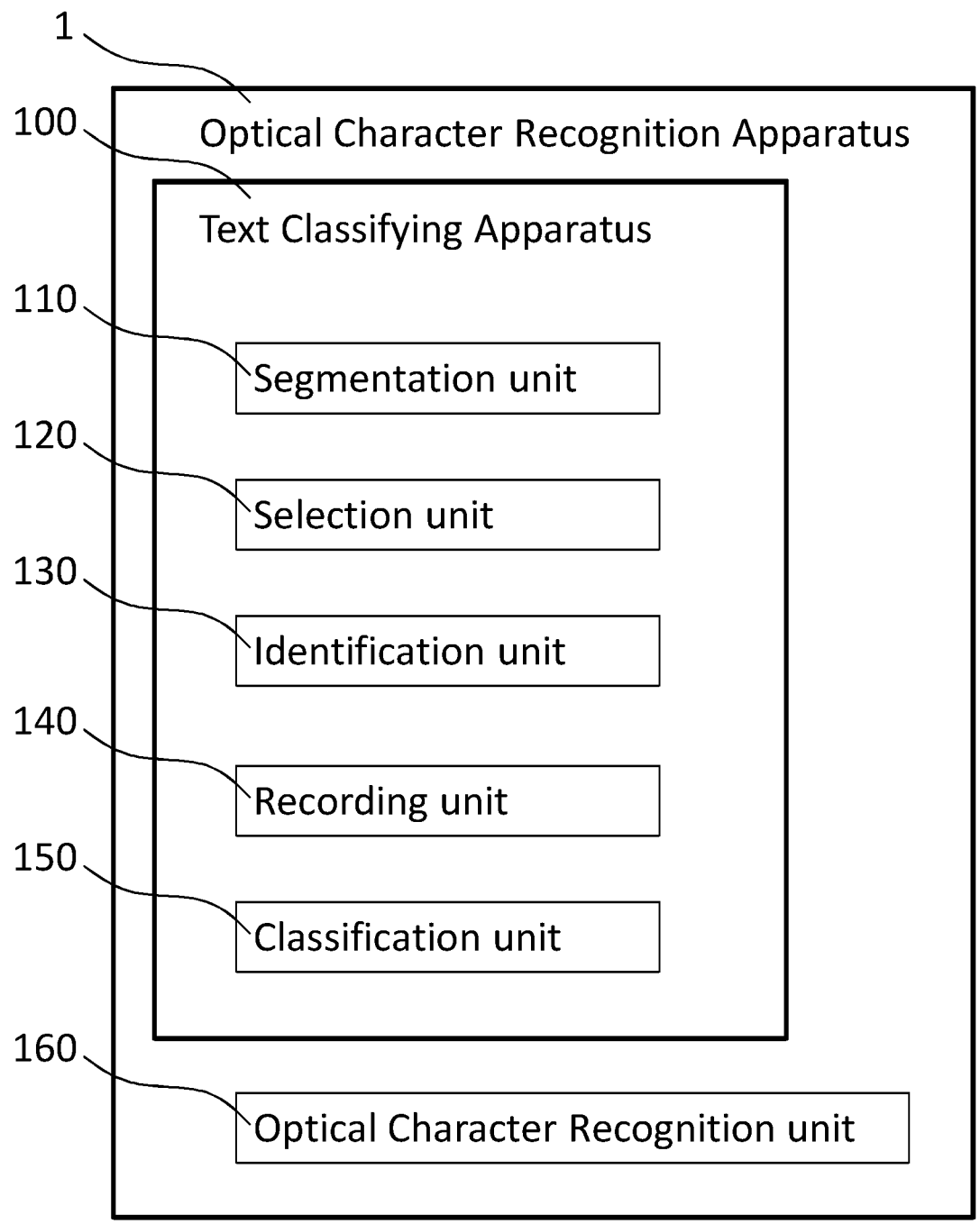
FIG. 1 is a schematic diagram illustrating an optical character recognition apparatus.

FIG. 1 is a schematic diagram illustrating an optical character recognition apparatus 1, comprising a text classifying apparatus 100 and an optical character recognition unit 160. The optical recognition apparatus 1 is configured to perform optical character recognition (OCR).

The text classifying apparatus 100 comprises a segmentation unit 110, a selection unit 120, an identification unit 130, a recording unit 140, and a classification unit 150. The segmentation unit 110 is configured to segment an image into a plurality of lines of text. The selection unit 120 is configured to select a line of text from the plurality of lines of text. The identification unit 130 is configured to identify a sequence of classes corresponding to the selected line of text. The recording unit 140 is configured to record, for the selected line of text, a global class corresponding to a class of the sequence of classes. The recording unit 140 is configured to maintain a global list of classes arranged in descending order of frequency. It is updated with the content of each line that is being analysed. The topmost class in the recording unit 140 is the current best candidate for the global class of the image. The final classification of the image is done by the classification unit. The classification unit 150 is configured to classify the image, based on the data provided by the recording unit 140, and thus based on a confidence level of the global class.

The text classifying apparatus 100 is configured to identify attributes of the image, before OCR is performed by the OCR unit 160. Thus, the processing demand by the OCR unit 160 is reduced by configuring the OCR unit 160 to perform OCR that is tailored to the specific attributes identified by the text classifying apparatus 100. Efficiency of OCR is enhanced if one or more of the following attributes have first been detected:

the script of text (script attribute);
the language of text (language attribute);
the font of the text (font attribute);
whether the text is in italics (italics attribute);
whether the text is in bold (bold attribute);
whether the text is underlined (underline attribute);
the skew of the text (skew attribute);
the orientation of the text (orientation attribute); and
whether segmented lines of text are horizontal or vertical (horizontal/vertical attribute).

For the script attribute, examples of script classes are Latin, Cyrillic, Arabic, Korean, Chinese, Japanese, Hebrew, Greek, Indic, Bengali, Devanagari, Tamil, Thai, Morse code, and Braille characters.

It is possible for a class to incorporate a number of sub-classes. If the script attribute is identified as the Chinese script class, no distinction is made at first, between the Traditional Chinese sub-class and Simplified Chinese sub-class. It is difficult for the text classification software to distinguish between these sub-classes, because there is an overlap in the appearance of ideograms written in the Traditional Chinese sub-class and the Simplified Chinese sub-class. Instead, Traditional Chinese and Simplified Chinese are recognized as a broader Chinese script. OCR is performed assuming that the script is a mix of Simplified Chinese and Traditional Chinese. The OCR result is then classified as Simplified Chinese or Traditional Chinese using a Naïve Bayesian classifier based on character frequencies. This is because it has been found to be more accurate for the Traditional Chinese sub-class and the Simplified Chinese sub-class to be distinguished after the OCR has taken place.

For the language attribute, examples of language classes are English, French and Spanish, for which the script attribute corresponds to the Latin script class.

For the skew attribute, this is recorded by measuring the angle of the text with respect to a horizontal axis of the image. Angle is a continuous variable, measured in degrees or radians. The angle can be measured to within a tolerance, so that text having a skew within a tolerance are associated with a specific skew class. Assessment of the skew attribute allows display of the image to be corrected to remove the skew, by rotating the image. Documents are conventionally presented on rectangular pages, with text presented at an orientation with respect to the horizontal of 0, 180, 90 and 270 degrees. Thus, the orientation attribute can be considered as a subset of skew attribute.

For the orientation attribute, examples of classes are 0 degrees, 90 degrees, 180 degrees, and 270 degrees, for which it is possible to record an orientation of the text with respect to the horizontal. The angle of the text with respect to the horizontal is measured to within a tolerance level, and so text that is within the vicinity of an orientation class will be classified. Furthermore, it is not necessary for the orientation attribute to be restricted to the specific 0, 90, 180 and 270 degree classes, and instead, the text classifying apparatus can be configured to appreciate that angle is a continuous variable.

The identification of a number of attributes further enhances the efficiency of OCR. The plurality of attributes can be identified together in a single attribute analysis of the image, or by performing a plurality of separate attribute analysis steps. Examples of attributes being detected in combination include:

the identification of both the script attribute and the orientation attribute; and
the identification of both the orientation attribute and the vertical/horizontal attribute.

Recording of the script attribute and orientation attribute of the text is performed in a single step. Thus, an example of the (script, orientation) attribute is the (Latin, 0 degrees) class. The recording of the (script, orientation) attribute as a combined attribute is achieved by training the text classifying apparatus to recognise samples of text that are designated as having both the script attribute and the orientation attribute.

Recording of the script attribute is a step that occurs prior to the recording of the language attribute. For example, following a recording that the script attribute corresponds to the Latin script class, a subsequent assessment of the language attribute finds that the language attribute corresponds to the English language class. The recording of the script attribute prior to the detection of language attribute reduces the processing burden placed on the language attribute recording step. Once the script class and language class are both known, the processing burden is reduced when performing OCR, because a dictionary can be selected that is restricted to the specific language class that has been detected. Note that the recording of the language class is not an essential step, because OCR can be performed making use of the script class, without it being necessary to record the language class.

Image classification is performed by analysing the image using a neural network that has been trained to distinguish between different classes. A neural network is trained to identify a class using a data set that includes examples of members of the class. The neural network is trained to identify a script class using a data set including characters belonging to the specific script class. For the specific arrangement in which the neural network is trained to recognise both the script class and orientation class in a single step, the data set includes characters belonging to the specific script class, wherein these characters are input at a plurality of different orientations.

The neural network comprises multiple convolution and recurrent network layers. Convolution layers are first layers that the image passes through and they compute various filters that define certain features of the image that contributes to learning the problem at hand. The convolved images are then passed through the LSTM (Long Term Short Memory)-based recurrent network layer which recognizes the sequence of characters.

The neural network is trained to recognise the Latin class using text samples that include characters in the Latin class. The data set comprises a number of font samples that include alphabets that identify individual machine readable characters, in a variety of different fonts. Alternatively, or in addition, the data set comprises a library of text documents. The text samples are input at a plurality of orientations, with the Latin class being input at 0 degrees, 90 degrees, 180 degrees, and 270 degrees. This training is repeated for the other specific script classes.

A typical document in many languages is conventionally read by users from left-to-right, such as for text in the English language. In other languages, a typical document is read by users from right-to-left, such as for text in the Arabic language. For text that is read from left-to-right or right-to left of the image, the text is presented as horizontal lines, wherein both the line and the individual characters have an orientation of 0 degrees.

Sometimes, a line text is read by users from top-to-bottom, which occurs more commonly in some languages such as Chinese. Even for languages in which documents are conventionally read along horizontal lines, there are occasions for which text is presented vertically, for reasons such as to make best use of the space available, or to draw attention to the text. It is rare for a line of text to be read by users from bottom-to-top. For text that is read from top-to-bottom or bottom-to-top of the image, the text is presented as vertical lines, wherein line has an orientation of 90 degrees, and the individual characters have an orientation of 0 degrees.

The training data sets include samples to accommodate the different directions in which text is conventionally presented. During training and also during image analysis, the accuracy of the text classification software is enhanced by performing text classification in both directions. Thus, horizontal lines of text are read by the text classification software from both left-to-right and right-to-left. Similarly, vertical lines of text are read by the text classification software from both top-to-bottom and bottom-to-top. Thus, the image analysis to record attributes of the line are not constrained by the reading convention of the specific language. Accordingly, if a line of text is identified as having a horizontal orientation, the text classification performs attribute analysis by being reading the text from both left-to-right and right-to-left, regardless of whether the language attribute corresponds to the English class or the Arabic class.

If the document has been oriented at an angle, then this can be detected, and so the correct orientation of the image can be recorded. Accordingly, if the orientation attribute is recorded as corresponding to the 90, 180 or 270 degrees classes, then this indicates that the image is incorrectly oriented, and should therefore be rotated to compensate for the orientation class that has been recorded. If necessary, rotation of the document is performed by the text recognition software, so that the text is presented to the user at the conventional orientation.

Figure 2:
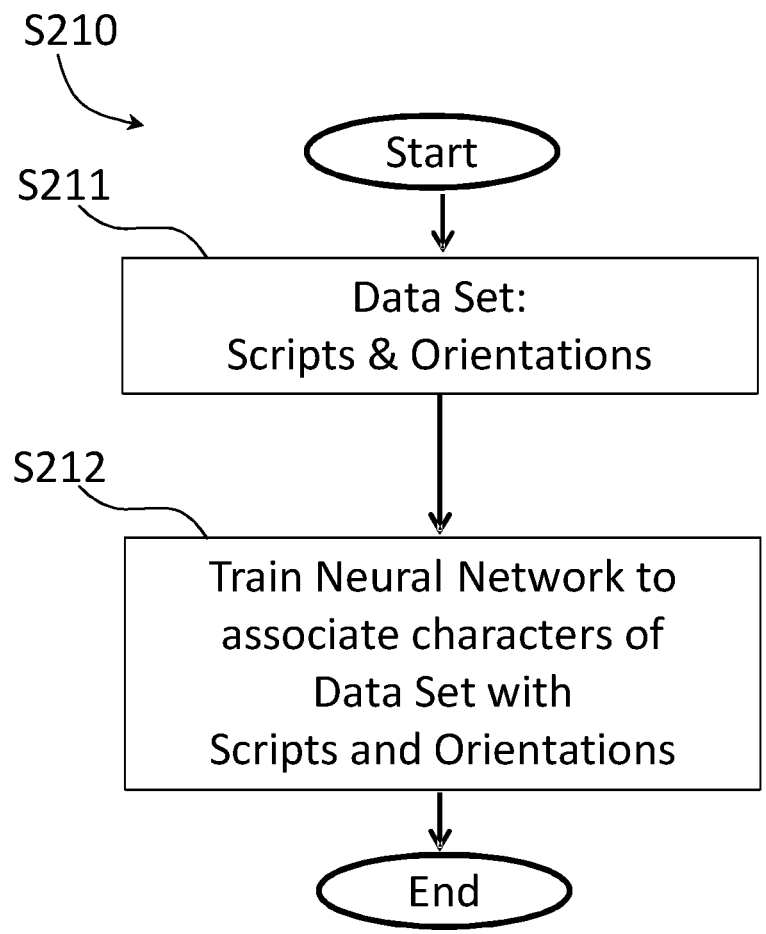
FIG. 2 is a flow chart illustrating how a neural network can be trained to associate characters of a data set with scripts and orientations.

FIG. 2 is a flow chart illustrating how a neural network can be trained to associate characters of a data set with one or more attributes S210.

In step S211, a data set is compiled that includes samples of text, with each sample having an attribute that is identified as corresponding to a specific class. In this example, the data set of S211 comprises samples of text that are each identified as belonging to a specific (script, orientation) class.

In step S212, the neural network is trained to associate samples of the data set with each specific class. Once trained, the neural network can distinguish between samples having different classes. Thus, the text classifying apparatus 100 is configured to make use of the trained neural network, so that it can identify the attribute of an image that has not been encountered before.

Figure 3:
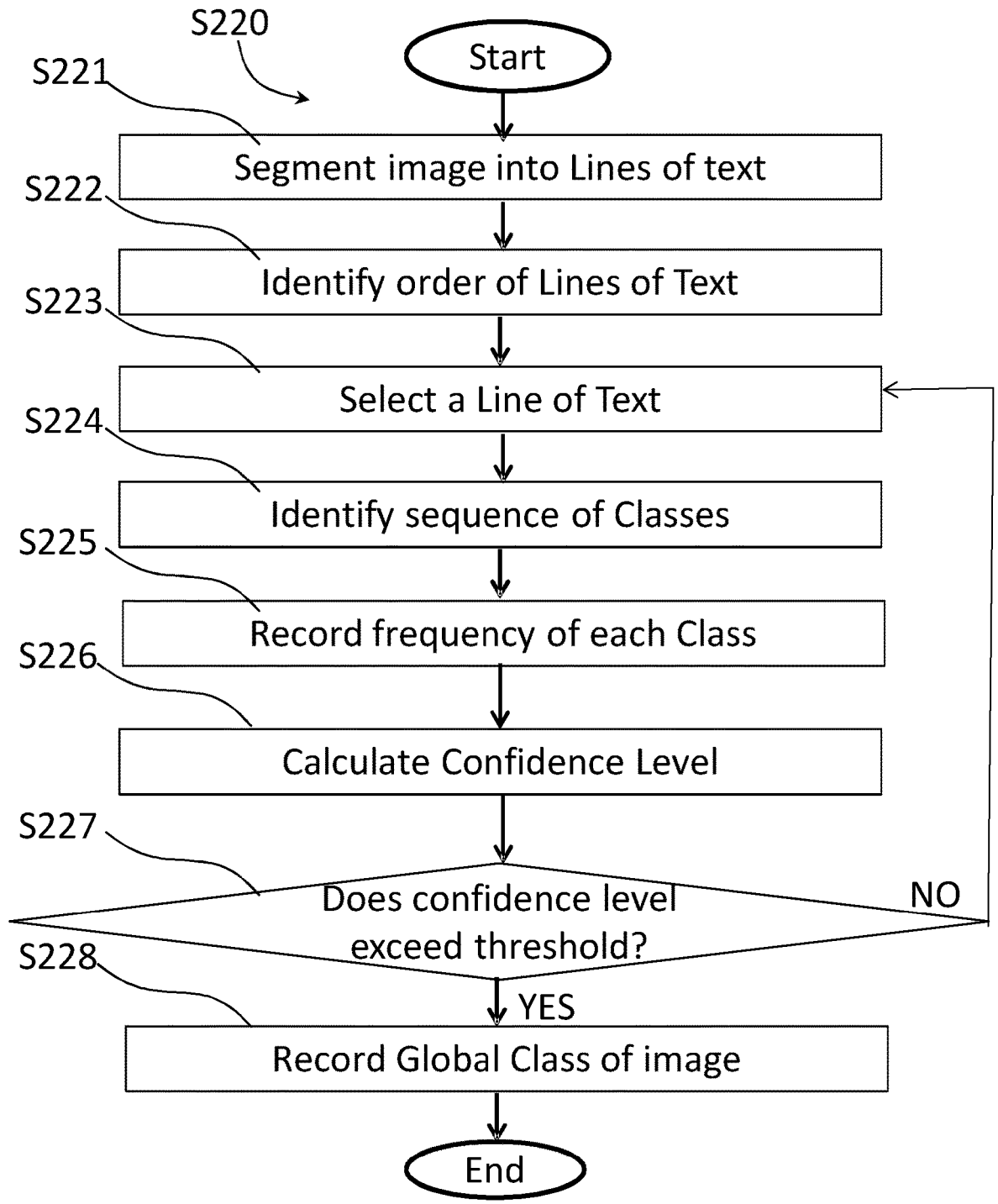
FIG. 3 is a flow chart illustrating image classification.
Figure 4A:
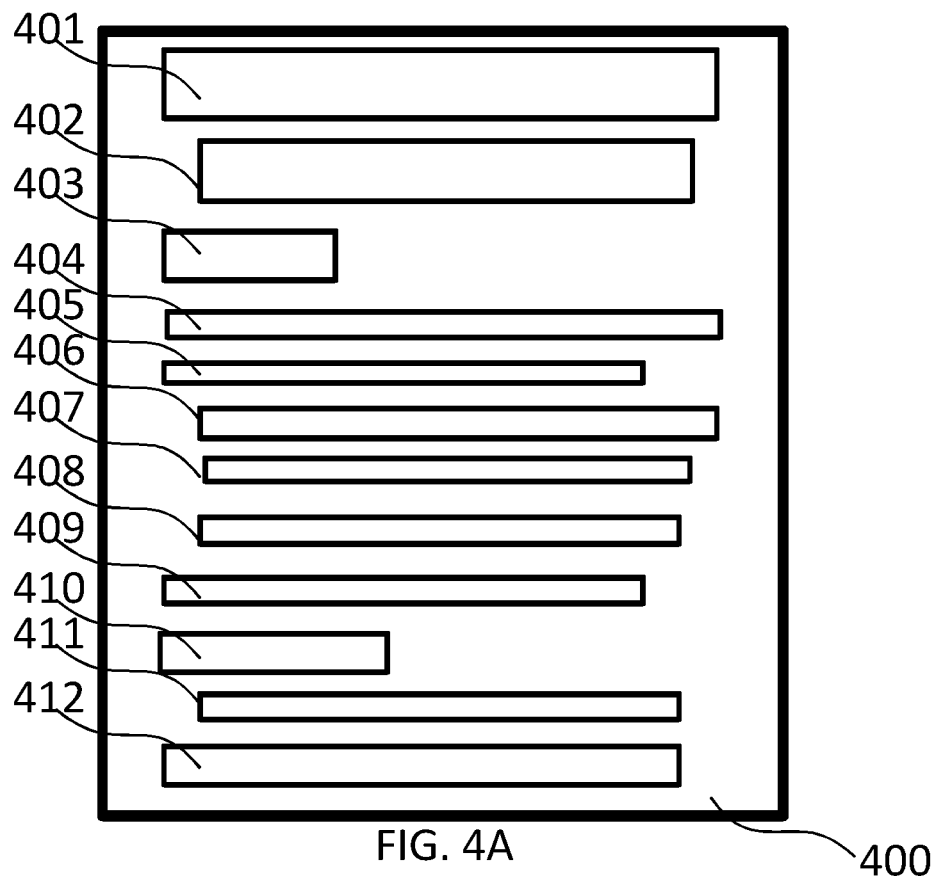
FIGS. 4A-B are schematic diagrams illustrating line segmentation of images.
Figure 4B:
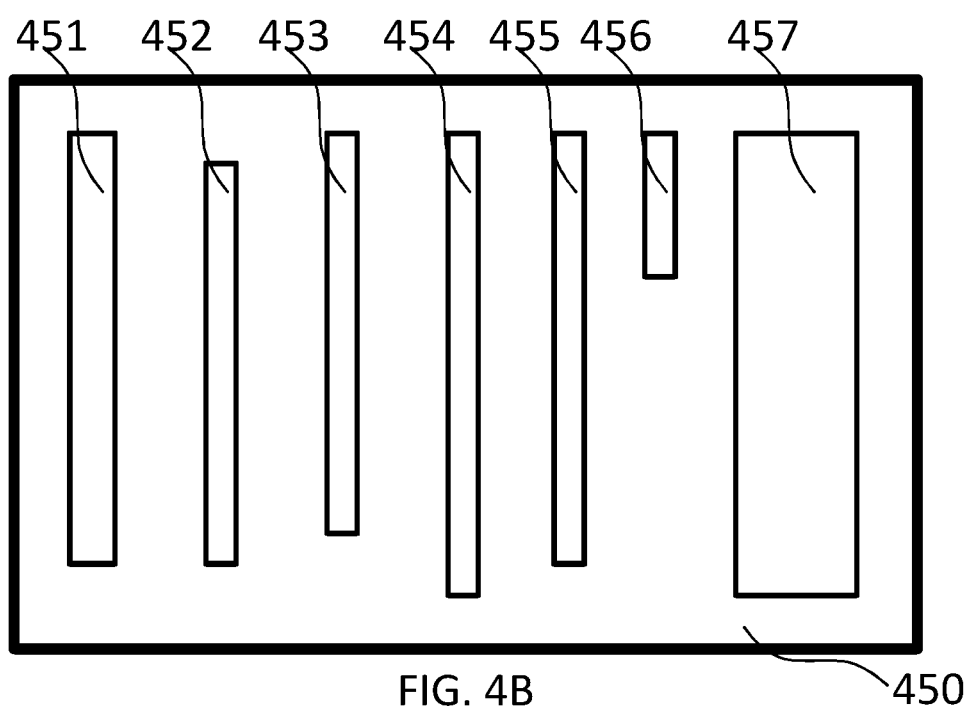

FIG. 3 is a flow chart illustrating image classification S220. In step S221, the image is segmented into a plurality of lines of text. FIGS. 4A and 4B show examples of image segmentation. In FIG. 4A, the image 400 is segmented into horizontal lines 401-412. In FIG. 4B, the image 450 is segmented into vertical lines 451-457. The lines of text 401-412, 451-457 are indicated by a bounding box surrounding the segmented text.

This arrangement does not require segmentation of the lines of text 401-412, 451-457 into individual characters. Character segmentation is particularly difficult for many text images, for example, due to individual characters corresponding to the same connected component, due to the writing being written in a joined up font, or containing diphthongs, ligands or underlined text. The performing of per-line level analysis, without the performing of character segmentation, enhances the accuracy of the text classification.

In step S222, the plurality of lines of text are put into an order in which text recognition should be performed. The purpose of this is so that text classification is performed on lines for which it is expected that classification will be most accurate. This serves to reduce the processing burden when performing image classification, because the attribute analysis is stopped once an image is classified to a sufficient level of confidence.

The order is recorded based on the aspect ratio of the line of text. The bounding box of each line of text is a rectangle having an aspect ratio equal to the longer side divided by the shorter side. The lines of text are ordered by aspect ratio, from highest to lowest, because text having a higher aspect ratio is likely to contain more characters.

The probability of a feature that has been segmented by the segmentation unit 110 corresponding to a line of text is computed by the selection unit 120 calculating an inverse tangent of the aspect ratio. The aspect ratio is a number larger than 1, because it is calculated by dividing the longer side divided by the shorter side of the rectangle. A "confidence of line" measure is calculated by taking the inverse tangent of the aspect ratio, and dividing this result by pi/2. As a consequence, this number provides a probability measure between 0 and 1, thus indicating the confidence that the detected feature corresponds to a line of text.

$$\text{Confidence of line} = \arctan(\text{aspect ratio}) * 2/\text{pi}$$

The arctan function is useful because it the confidence of line probability measure strictly increases as the aspect ratio increases. Aspect ratio is a strictly positive quantity, and so this calculation results in a number greater than 0. The division by pi/2 provides a number that is less than 1, because the arctan function is configured using radians. As a consequence a probability measure is provided to identify whether a line of text has been identified. For candidates that are identified as being lines, the line having highest aspect ratio is selected by selecting the corresponding line for with the confidence of line measure is greatest.

In step S223, a line of text is selected from the plurality of lines. The line of text having the highest aspect ratio is selected. If it is necessary to select a further line of text, then the line of text having the next highest ratio is selected. The selection of lines of text continues until the identification of a global class of the image exceeds a threshold confidence level, or until all of the lines of text have been analysed.

In step S224, a sequence of classes are identified that correspond to the line of text. Examples of recognised sequences are shown in FIGS. 5A-5D, which show a schematic of line samples 501-504 that have been extracted from some example documents. For each of the line samples 501-504, the (script, orientation) attribute is detected, resulting in the recording of a sequence of (script, orientation) classes.

Figure 5A:
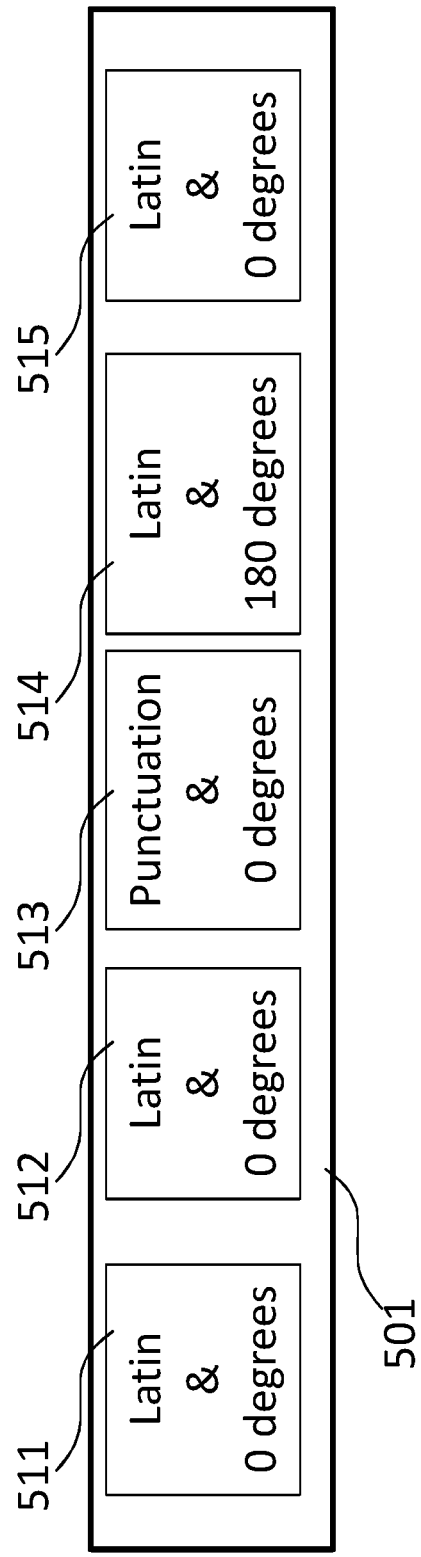
FIGS. 5A-D are diagrams illustrating sequences of classes that are output following line classification.

For line 501 in FIG. 5A, the sequence of classes 511-515 is output as:
(script, orientation)=(Latin, 0 degrees); (Latin, 0 degrees); (Punctuation, 0 degrees); (Latin, 180 degrees); and (Latin, 0 degrees).

Figure 5B:
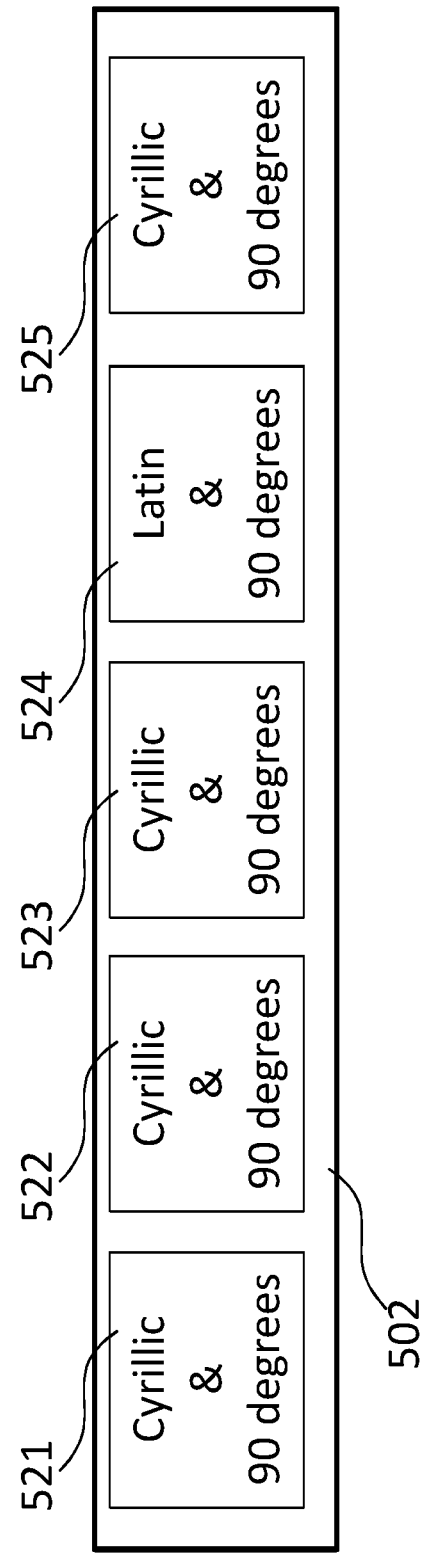

For line 502 in FIG. 5B, the sequence of classes 521-525 is output as:
(script, orientation)=(Cyrillic, 90 degrees); (Cyrillic, 90 degrees); (Cyrillic, 90 degrees); (Latin, 90 degrees); and (Cyrillic, 90 degrees).

Figure 5C:
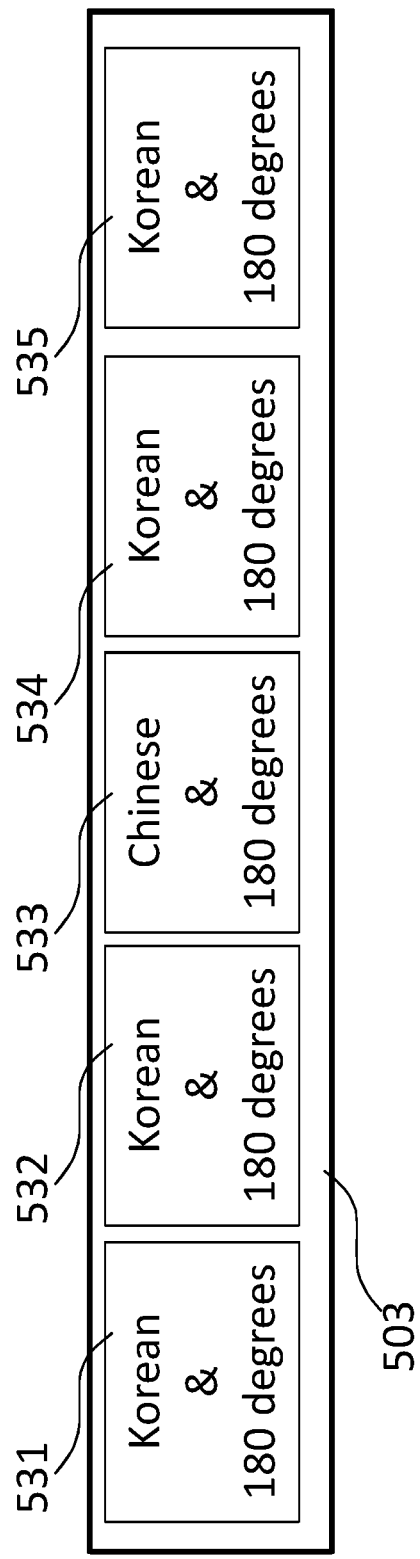

For line 503 in FIG. 5C, the sequence of classes 531-535 is output as:
(script, orientation)=(Korean, 180 degrees); (Korean, 180 degrees); (Chinese, 180 degrees); (Korean, 180 degrees); and (Korean, 180 degrees).

Figure 5D:
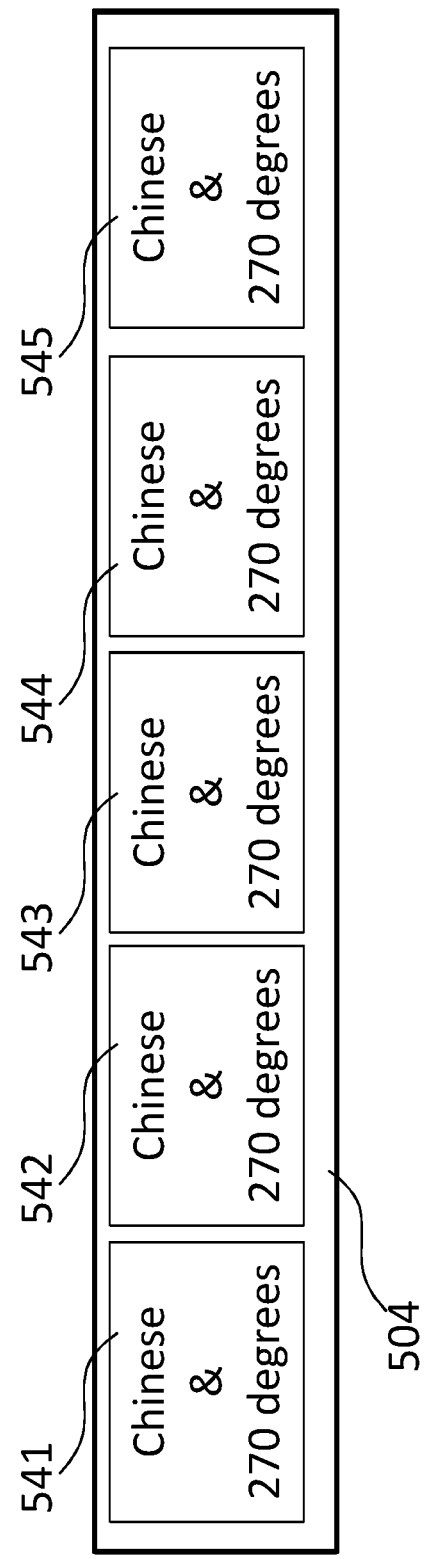

For line 504 in FIG. 5D, the sequence of classes 541-545 is output as:
(script, orientation)=(Chinese, 270 degrees); (Chinese, 270 degrees); (Chinese, 270 degrees); (Chinese, 270 degrees); and (Chinese, 270 degrees).

Regarding the member of the sequence 513 in line 501 of FIG. 5A, the script class is identified as being punctuation. This is handled by eliminating characters such as punctuation, spaces and digits from the recording of the global class of the image. As an alternative, the neural network can be trained to distinguish between punctuation that this used for different scripts, so that the punctuation analysis contributes to the recording of the global class.

Regarding the member of the sequence 514 in line 501 of FIG. 5A, the orientation class of 180 degrees has been detected in error. A possible reason for this incorrect orientation being detected is that some character pairs can look the same in inverted orientation, such as the character pairs: (u, n); (p, d); and (M, W). This can be mitigated by training of the neural network to recognise scripts at different orientations, so that when detecting, the neural network can take the existence of character pairs into account, so that such characters can be eliminated from the detection of the global class.

Regarding the member of the sequence 524 in line 502 of FIG. 5B, the script class of Latin has been detected in error. A possible reason for this incorrect script recording is that many scripts have characters that are identical or similar to one another. This can be mitigated by training of the neural network to recognise which characters of different scripts are similar to one another, so that such characters can be eliminated from the detection of the global class.

Regarding the member of the sequence 533 in line 503 of FIG. 5C, the script class of Chinese has been detected correctly, although this corresponds to a Korean document that contains Chinese characters that provide additional context. Like Korean, many languages commonly include elements of other languages. When customising the OCR based on the detection of Korean script, account is taken of the fact that it is normal for Korean text to contain Chinese characters for the purpose of ambiguity resolution. Likewise, the customisation of OCR for every language is configured to also be customised to read English, because it is very common for English text to be included to provide additional context.

The script and language recording unit 140 is aware of that fact and will not treat Chinese and Korean in the same page the same way that it would treat Chinese and French in the same page. Chinese and French on the same page will be classified as page with mix of French and Chinese while Chinese and Korean in the same page (with expected proportion) will be classified as pure Korean. This process is known as "ambiguity resolution".

This is done by maintaining a table of accepted foreign inclusion in every language with corresponding max fraction and assigning characters of that foreign language to the best language if possible. Inclusion is considered possible if the ratio number of character of foreign language over number of characters of best language is within the bounds specified in the table of accepted foreign languages.

Regarding the members of the sequence 541-545 in line 504 of FIG. 5D, subsequent attribute analysis records whether the Chinese script class corresponds to the Traditional Chinese sub-class or the Simplified Chinese sub-class, because it has been found to be more accurate to record the sub-class after the script attribute analysis stage.

Errors for specific detections can be eliminated if the confidence level for the global result exceeds a threshold. Thus, this error will not affect the final result of the global class, if a sufficient number of correct results of 0 degrees are detected.

In step S225, for the selected line, the frequency of each class is recorded.

For line 501 in FIG. 5A:
a frequency of 3 is recorded for the class (Latin, 0 degrees);
a frequency of 1 is recorded for the class (Puncutation, 0 degrees); and
a frequency of 1 is recorded for the class (Latin, 180 degrees).

For line 502 in FIG. 5B:
a frequency of 4 is recorded for the class (Cyrillic, 90 degrees); and
a frequency of 1 is recorded for the class (Latin, 90 degrees).

For line 503 in FIG. 5C:
a frequency of 5 is recorded for the class (Korean, 180 degrees).

For line 504 in FIG. 5D:
a frequency of 5 is recorded for the class (Chinese, 270 degrees).

In step S226, an assessment is made of whether the global class of the document has been detected to the required level of confidence. A confidence level is calculated based on all of the lines of text that have been analysed. This confidence level is recorded by the recording unit 140.

The "global class" identifies a class associated with the image as a whole. Details of the calculation used to assess the global class are provided below (see the discussion of FIG. 7C).

In step S227, an assessment of made of whether the confidence level exceeds a threshold. If the confidence level does exceed the threshold, then the process progresses to step S228. If the confidence level does not exceed the threshold, then the process returns to step S223, and another line of text is selected, until all of the lines of text have been analysed.

If all of the lines of text have been analysed, then the process proceeds to step S228 making use of the attribute analysis available for all of the lines of text. If the confidence level exceeds the threshold, then the global class is associated with the image. However, if after analysing all of the available lines of text, the global class does not exceed a threshold, then it is necessary to select a broad customisation of the OCR that covers the detected classes. This assessment applies to the situation in which the image contains a single line of text.

In step S228, a recording is made of the global class. If a global class is identified with a high level of confidence, then this indicates that the whole document can be associated with a single class of the attribute. The global class of the document is associated with the image, with the global class being used by the OCR unit 106 to perform OCR tailored to the specific global class. As a consequence, the image analysis is performed for the specific global class, which reduces the computation resources used by the processing.

If the global class is identified with a low level of confidence, then this could indicates errors in the attribute analysis, or that the whole document includes text that belongs to multiple classes. In this case, the global class of the document identifies that multiple classes have been detected. This global class information is associated with the image, and is used by the OCR unit 106 to perform OCR making use of a broader range of classes for the subsequent analysis. As a consequence, the OCR image analysis by the OCR unit 150 is not restricted to a specific class, which ensures that a broad image analysis is performed.

It is possible for an image to be associated with a plurality of global classes. As a consequence, this allows the classification of images that contain a plurality of classes, or images for which it is not possible to accurately identify the appropriate global class. The recording unit 140 is configured to record, for the selected line of text, a plurality of global classes, wherein each global class of the plurality of global classes corresponds to a class of the sequence of classes. The classification unit 150 is configured to classify the image according to the plurality of global classes, based on a confidence level of each of the plurality of global classes.

Samples of scripts that have been subject to script and orientation classification are shown in FIGS. 6A-6D, for which:

FIG. 6A shows a sample of text which is identified as having a (script, orientation) attribute in the (Korean, 0 degrees) class.

FIG. 6B shows a sample of text which is identified as having a (script, orientation) attribute in the (Cyrillic, 180 degrees) class.

FIG. 6C shows a sample of text which is identified as having a (script, orientation) attribute in the (Arabic, 90 degrees) class.

FIG. 6D shows a sample of text which is identified as having a (script, orientation) attribute in the (Latin, 270 degrees) class.

FIGS. 7A-C serve to illustrate image classification for a specific image sample. FIG. 7A shows the input image of a document that comprises a plurality of lines of text. FIG. 7B shows the result of line segmentation, with the lines 701-705 being ordered by their aspect ratio. Text classification is performed first on line 701 because it is identified as having the highest aspect ratio. If it is necessary to perform further text classification, then line 702 will be selected. This continues until the confidence level exceeds a threshold, or all of lines 701-705 have been subject to text classification. FIG. 7B includes for each line a value for the confidence of line parameter, calculated as the inverse tangent of the aspect ratio, divided by pi/2. Accordingly, it is possible to select the most appropriate line having the largest aspect ratio, while eliminating from consideration features that are not lines, such as a fragment of the document that has been mischaracterised, a graphic, a signature, a box, noise, or a shadow.

FIG. 7C provides a table that shows results of text classification. Each line of text is passed though the neural network to classify the line according to script and orientation. A list of results is formed, each element of which contains the fields (script, orientation, frequency). This list is arranged in descending order of frequency for each result. After a line is processed, a confidence value of the result, which is defined as the percentage difference between the frequency of the best result and the frequency of the second best result is computed.

If the confidence of the result was greater than an empirically defined threshold, then the processing stops and the image is classified according to the (script, orientation) class having the maximum frequency. Otherwise, the next line is processed from the lines of text, and the list of results is updated with the results from the new line. The process continues until either a script and orientation result has been found with a high enough confidence level, or until all of the lines have been processed.

For line 1 of FIG. 7C (feature 701), the (script, orientation) attribute is identified as being in the (Cyrillic, 0 degrees) class with a frequency of 19, and in the (Latin, 0 degrees) class with a frequency of 18. Since this is the only line to be assessed, line 1 (feature 701) contributes to the global result.

The confidence value is calculated as the percentage:

(the highest frequency class−the second-highest frequency class)/the second highest frequency class.

This formula allows an assessment of whether classification has ended or not. The statistical significance of this calculation of the confidence value is that the highest frequency class will be selected if it is much higher than any other classes that have been identified. If one particular class is detected with much more confidence than other classes, then the confidence value will be high, allowing the other classes to be disregarded from the assessment of the global class.

For line 1, (19−18)/18=5.5%.

For line 2, (35−25)/25=40%.

For line 3, (53−34)/34=55.8%.

For line 4, (63−45)/45=40%.

For line 5, (72−45)/45=60%.

For the present sample, the confidence threshold is set to a value of 60%. Therefore, after the global result has been recorded for line 5 of FIG. 7C, the text classification ends, returning the global result that the (script, orientation) attribute is recorded to be in the (Cyrillic, 0 degrees) global class, with a confidence level of 60%.

The lines of the table show that as the analysis progresses to include additional lines of text, the list of candidate (script, orientation) classes are maintained, with this list being arranged in decreasing order of confidence. This list is updated as more lines are processed. Already existing candidates see their confidence increased as new candidates are added. Eventually, the list provides analysis of all of the scripts and orientations that have been found on at least a part of the image.

From this list, the result corresponding to highest confidence is assigned as the (script, orientation) global class of the image. The OCR unit 106 is customised for this global class.

If a small number of candidates have a high confidence at the end, then both of these (script, orientation) global classes can be returned. This indicates a mix of classes have been identified. In this case, the OCR unit 106 can be customised according to all of the (script, orientation) global classes that have been returned. Thus, at the line level, no ambiguity resolution is done unless there was only one line on the image If, for example, a document includes text in the Cyrilic script class and the Latin script class, for the purpose of ambiguity resolution, it is not necessary to segment individual lines to distinguish between the different scripts. This is because the text classification software can handle the presence of a plurality of scripts in a particular line of text. The frequencies of members of individual classes is cumulatively assessed over a plurality of lines in order to record the global class. If it is recorded to beneficial for the customisation of the OCR unit, then the image can be associated with a plurality of global classes.

The present technique makes use of as much information as possible from the lines of text that have been analysed, thus enhancing the accuracy of the text classification. This is achieved because the assessment of one or more global class makes use of cumulative frequency analysis, without neglecting any of the collected data. For example, FIGS. 7A-C show a (script, orientation) global class being identified that makes use of all of the (script, orientation, frequency) class data associated with each line and each identified class. Gathering more information about the image allows an increase in the precision of the global class recording. This enhances processing speed, because an accurate recording of global class is achieved by performing analysis of fewer lines of text.

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

While the present disclosure has described example embodiments, it is to be understood that some embodiments are not limited to the disclosed embodiments. Embodiments can be implemented in various forms without departing from the principal features of the present disclosure. The scope of the following claims is to be accorded the broadest interpretation so as to encompass all such modifications and equivalent structures and functions.

The invention claimed is:

1. A text classifying apparatus, comprising:
a segmentation unit configured to segment an image into a plurality of lines of text;
a selection unit configured to select a line of text from the plurality of lines of text;
an identification unit configured to identify a sequence of classes corresponding to the selected line of text, each class comprising both a script and an orientation;
a recording unit configured to record, for the selected line of text, a global class corresponding to a class of the sequence of classes; and
a classification unit configured to classify the image according to the global class, based on a confidence level of the global class.

2. The text classifying apparatus according to claim 1, wherein:
the recording unit is configured to record, for the selected line of text:
a frequency associated with each of the classes in the sequence of classes; and
the confidence level which establishes whether the global class corresponds to a highest frequency class of the sequence of classes.

3. The text classifying apparatus according to claim 1, wherein:
the selection unit is configured to select another line of text, if the confidence value is below a threshold;
the identification unit is configured to identify a plurality of sequences of classes corresponding to the selected lines of text; and
the recording unit is configured to record, for the selected lines of text, the global class corresponding to a class of the plurality of sequences of classes.

4. The text classifying apparatus according to claim 1, wherein:
the classification unit is configured to classify the image according to the global class, if the confidence level is above a threshold.

5. The text classifying apparatus according to claim 1, wherein:
the classification unit is configured to classify the image according to a plurality of global classes, if the confidence level is below a threshold.

6. The text classifying apparatus according to claim 1, wherein:
the selection unit is configured to select the line of text based on an aspect ratio of the line of text.

7. The text classifying apparatus according to claim 1, wherein:
based on the orientation of the text, the orientation of image is corrected before being presented to a user.

8. The text classifying apparatus according to claim 1, further comprising:
a neural network that has been trained to recognize the class using a dataset that comprises a plurality of samples of text.

9. The text classifying apparatus according to claim 8, wherein:
the dataset comprises a plurality of orientations of the plurality of samples of text.

10. The text classifying apparatus according to claim 8, wherein the neural network comprises:
a convolution neural network configured to perform image recognition of the line of text; and
a recurrent neural network configured to perform sequence recognition of the line of text.

11. The text classifying apparatus according to claim 1, wherein:
the recording unit is configured to record, for the selected line of text, a plurality of global classes, wherein each global class of the plurality of global classes corresponds to a class of the sequence of classes; and
the classification unit is configured to classify the image according to the plurality of global classes, based on a confidence level of each of the plurality of global classes.

12. An optical character recognition apparatus, comprising:

a text classifying apparatus, comprising:
- a segmentation unit configured to segment an image into a plurality of lines of text;
- a selection unit configured to select a line of text from the plurality of lines of text;
- an identification unit configured to identify a sequence of classes corresponding to the selected line of text, each class comprising both a script and an orientation;
- a recording unit configured to record, for the selected line of text, a global class corresponding to a class of the sequence of classes; and
- a classification unit configured to classify the image according to the global class, based on a confidence level of the global class; and an optical character recognition unit configured to perform optical character recognition on the image, by applying the global class that classifies the image.

13. A text classifying method, comprising:

segmenting an image into a plurality of lines of text;
selecting a line of text from the plurality of lines of text;
identifying a sequence of classes corresponding to the selected line of text, each class comprising both a script and an orientation;
recording, for the selected line of text, a global class corresponding to a class of the sequence of classes; and
classifying the image according to the global class, based on a confidence level of the global class.

14. A non-transitory computer-readable medium storing a program that when executed by a text classifying apparatus, causes the text classifying apparatus to perform a text classifying method, comprising:

segmenting an image into a plurality of lines of text;
selecting a line of text from the plurality of lines of text;
identifying a sequence of classes corresponding to the selected line of text, each class comprising both a script and an orientation;
recording, for the selected line of text, a global class corresponding to a class of the sequence of classes; and
classifying the image according to the global class, based on a confidence level of the global class.

\* \* \* \* \*